US010825122B2

(12) United States Patent
Wang et al.

(10) Patent No.: US 10,825,122 B2
(45) Date of Patent: Nov. 3, 2020

(54) CONFIGURATION METHOD AND SYSTEM OF INDICATION DEVICE FOR DRIVER-PASSENGER MATCHING

(71) Applicant: BEIJING DIDI INFINITY TECHNOLOGY AND DEVELOPMENT CO., LTD., Beijing (CN)

(72) Inventors: Pengcheng Wang, Beijing (CN); Yongqing Mu, Beijing (CN); Qiang Ma, Beijing (CN); Chuanlan Li, Beijing (CN); Zhaozhi Sun, Beijing (CN); Quansheng Guo, Beijing (CN); Lu Qian, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/801,125

(22) Filed: Feb. 25, 2020

(65) Prior Publication Data

US 2020/0302566 A1    Sep. 24, 2020

(30) Foreign Application Priority Data

Mar. 20, 2019 (CN) .......................... 2019 1 0216131

(51) Int. Cl.
*H04W 24/00* (2009.01)
*G06Q 50/30* (2012.01)
(Continued)

(52) U.S. Cl.
CPC ......... *G06Q 50/30* (2013.01); *G01C 21/3415* (2013.01); *G06Q 10/047* (2013.01); *G08G 1/202* (2013.01); *H04W 4/023* (2013.01)

(58) Field of Classification Search
CPC ...... G06Q 50/30; G06Q 10/047; G08G 1/202; G01C 21/3515; H04W 4/023
(Continued)

(56) References Cited

U.S. PATENT DOCUMENTS 9,892,637 B2    2/2018  Demisse
9,970,615 B1    5/2018  Cardillo et al.
(Continued)

FOREIGN PATENT DOCUMENTS

JP    2002342427 A    11/2002
JP    2003058984 A    2/2003
(Continued)

OTHER PUBLICATIONS

The extended European Search Report issued in related European Application No. 20160820.5, dated Jul. 28, 2020, 15 pages.
(Continued)

*Primary Examiner* — Huy C Ho
(74) *Attorney, Agent, or Firm* — Bayes PLLC (57) ABSTRACT

Embodiments of the disclosure provide a method for configuring indication devices in transportation services. The method includes receiving a plurality of transportation requests including passenger pick-up points located in a preset geographical area. The method further includes identifying a first transportation request matching a first vehicle and a second transportation request matching a second vehicle, where the first vehicle and the second vehicle are detected to be located in the preset geographical area. The method also includes determining that first indication information assigned with the first transportation request shares an attribute with second indication information assigned with the second transportation request. The method additionally includes adjusting the first indication information so
(Continued)

that the first indication information no longer shares the attribute with the second indication information.

19 Claims, 7 Drawing Sheets (51) Int. Cl.
  *G08G 1/00* (2006.01)
  *G06Q 10/04* (2012.01)
  *G01C 21/34* (2006.01)
  *H04W 4/02* (2018.01)
(58) Field of Classification Search
  USPC .................................................... 455/456.1
  See application file for complete search history.

(56) References Cited

U.S. PATENT DOCUMENTS

| 2017/0012920 | A1* | 1/2017 | Chheda | ................ | H04L 51/066 |
| 2018/0096445 | A1* | 4/2018 | Eyler | .................... | G06Q 50/30 |
| 2018/0190110 | A1 | 7/2018 | Demisse et al. | | |
| 2019/0033856 | A1 | 1/2019 | Ferguson et al. | | |
| 2019/0096297 | A1 | 3/2019 | Cary et al. | | |
| 2019/0212157 | A1 | 7/2019 | Wu et al. | | |
| 2020/0151916 | A1 | 5/2020 | Kenney et al. | | |

FOREIGN PATENT DOCUMENTS

| JP | 2004054444 | A | 2/2004 |
| JP | 2018097514 | A | 6/2018 |
| JP | 2019144733 | A | 8/2019 |
| WO | 2015175030 | A1 | 11/2015 |

OTHER PUBLICATIONS

Notification of Reasons of Refusal issued in related Japanese Application No. 2020-041538, dated Jul. 14, 2020, 13 pages.
Non-Final Rejection in related U.S. Appl. No. 16/801,119, dated Aug. 9, 2020, 5 pages.

* cited by examiner

CONFIGURATION METHOD AND SYSTEM OF INDICATION DEVICE FOR DRIVER-PASSENGER MATCHING

CROSS-REFERENCE OF RELATED APPLICATIONS

This application hereby claims the benefits of priority to Chinese Application No. CN201910216131.6 filed on Mar. 20, 2019, which is hereby incorporated by reference in its entirety.

TECHNICAL FIELD

The present disclosure relates to a method for configuring indication devices, and more particularly to, a method for configuring indication devices to match passengers and drivers in transportation services.

BACKGROUND

Taxi passengers identify the vehicles matched to their requests through the indication information provided by the vehicle indication devices, such as light, pattern, color, etc. With the increase of users, a server needs to store a large number of different kinds of identification information, which will waste the server and communication resources. For example, if there are hundreds of thousands of users who need to use taxis in a city, then hundreds of thousands of different kinds of identification information will need to be assigned. However, it will reduce the recognition degree. For example, when a pattern is used as identification information, the more complex the pattern is, the lower the recognition degree is on the premise that the size of the indication device is limited. Hundreds of thousands of pieces of recognition information mean that hundreds of thousands of pictures must be displayed on the indication device, which certainly requires complex content of the pattern. In fact, since these hundreds of thousands of users can't possibly request vehicles at the same place at the same time, such kind of complex storage and assignment of identification information is unnecessary. Therefore, an improved system and method are needed to configure the indication device to provide transportation service.

Embodiments of the disclosure provides a method for configuring indication devices to match passengers and drivers in transportation services.

SUMMARY

In one aspect, embodiments of the disclosure provide a method for configuring indication devices in transportation services. The method includes receiving a first transportation request which includes a first passenger pick-up point located in a preset geographical area, and the first transportation request matches a first vehicle associated with a first indication device. The method also includes receiving a second transportation request which includes a second passenger pick-up point located in the preset geographical area, and the second transportation request matches a second vehicle associated with a second indication device. The method further includes determining a time difference between a first estimated time for the first vehicle to arrive in the preset geographical area and a second estimated time for the second vehicle to arrive in the preset geographical area, and sending first indication information to the first indication device and second indication information to the second indication device according to the time difference.

In another aspect, embodiments of the disclosure also provide a method for configuring indication devices in transportation services. The method includes receiving a plurality of transportation requests which include passenger pick-up points located in a preset geographical area. The method also includes identifying a first transportation request matched with a first vehicle and a second transportation request matched with a second vehicle, wherein the first vehicle and the second vehicle are detected to be located in the preset geographical area. The method also includes determining that first indication information assigned with the first transportation request shares an attribute with second indication information assigned with the second transportation request. The method further includes adjusting the first indication information so that the first indication information no longer shares the attribute with the second indication information.

In another aspect, embodiments of the disclosure also provide a system for configuring indication devices in transportation services. The system includes a communication interface configured to receive a first transportation request and a second transportation request. The system also includes at least one processor configured to receive the first transportation request which includes a first passenger pick-up point located in a preset geographical area, and the first transportation request matches a first vehicle associated with a first indication device. The at least one processor is also configured to receive the second transportation request which includes a second passenger pick-up point located in the preset geographical area, and the second transportation request matches a second vehicle associated with a second indication device. The at least one processor is also configured to determine a time difference between a first estimated time for the first vehicle to arrive in the preset geographical area and a second estimated time for the second vehicle to arrive in the preset geographical area, and is configured to send first indication information to the first indication device and second indication information to the second indication device according to the time difference.

In another aspect, embodiments of the disclosure also provide a system for configuring indication devices in transportation services. The system includes a communication interface configured to receive transportation requests. The system also includes at least one processor configured to receive a plurality of transportation requests including passenger pick-up points located in a preset geographical area. The at least one processor is also configured to identify a first transportation request matching a first vehicle and a second transportation request matching a second vehicle, wherein the first vehicle and the second vehicle are detected to be located in the preset geographical area. The at least one processor is also configured to determine that first indication information assigned with the first transportation request shares an attribute with second indication information assigned with the second transportation request. The at least one processor is also configured to adjust the first indication information so that the first indication information no longer shares the attribute with the second indication information.

In another aspect, embodiments of the disclosure also provide a non-transitory computer-readable medium having stored thereon computer instructions, when executed by at least one processor, perform a method for configuring indication devices to provide transportation service. The method includes receiving a first transportation request including a first passenger pick-up point located in a preset geographical area, the first transportation request matching a first vehicle associated with a first indication device. The method also includes receiving a second transportation request including a second passenger pick-up point located in the preset geographical area, the second transportation request matching a second vehicle associated with a second indication device. The method further includes determining a time difference between a first estimated time for the first vehicle to arrive in the preset geographical area and a second estimated time for the second vehicle to arrive in the preset geographical area, and sending first indication information to the first indication device and second indication information to the second indication device according to the time difference.

In another aspect, embodiments of the disclosure also provide a non-transitory computer-readable medium having stored thereon computer instructions, when executed by at least one processor, perform a method for configuring indication devices to provide transportation service. The method includes receiving a plurality of transportation requests including passenger pick-up points located in a preset geographical area. The method also includes identifying a first transportation request matched with a first vehicle and a second transportation request matched with a second vehicle, wherein the first vehicle and the second vehicle are detected to be located in the preset geographical area. The method also includes determining that first indication information assigned with the first transportation request shares an attribute with second indication information assigned with the second transportation request. The method further includes adjusting the first indication information so that the first indication information no longer shares the attribute with the second indication information.

It is to be understood that both the foregoing general description and the following detailed description are exemplary and explanatory only and are not restrictive of the invention, as claimed.

DETAILED DESCRIPTION

A clear and complete description of the technical solution of the present invention will be provided in conjunction with the drawings and a specific embodiment. It is clear that the embodiment described here is only a portion of the embodiments of the present invention, not all embodiments. Based on the specific embodiment described in the present invention, all other embodiments obtained by a person having ordinary skill in the art without inventive skills shall fall within the scope of protection of the present invention.

It will be appreciated that terms such as "first" and "second" in the specification and claims of the invention and the drawings above are used to distinguish similar objects, and the terms are not necessarily used to describe specific order or sequence. It should be understood that the terms used in this way can be interchanged when appropriate, which is only a way of distinguishing objects with same attributes in the embodiments of the invention. In addition, the terms "include" and "have" and any variations thereof are intended to cover the non-exclusive inclusion so that processes, methods, systems, products or devices that contain a series of units need not be limited to those units, but may include other units that are not clearly listed or inherent to those processes, methods, products or devices.

The accompanying drawings are included to illustrate particular embodiments of the invention. When appropriate, the following embodiments of the invention and the characteristics of the embodiments can be combined together.

Figure 1:
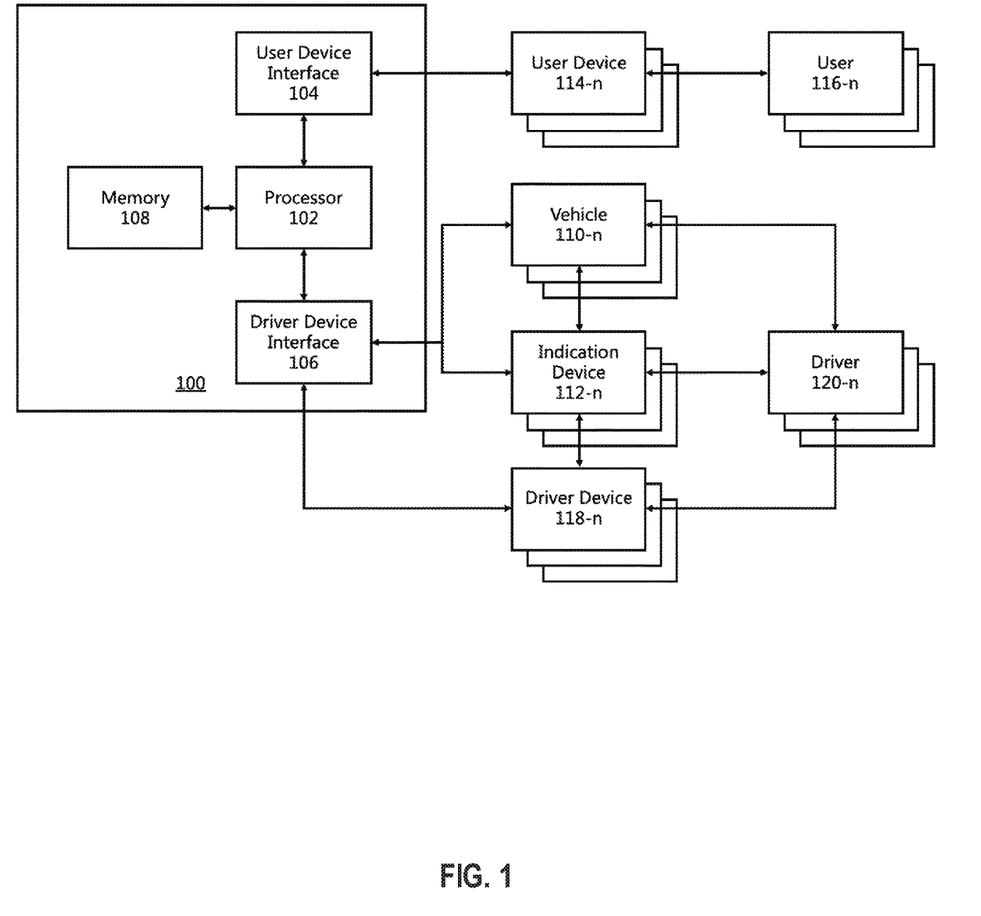
FIG. 1 illustrates a block diagram of an exemplary indication device configuration system, according to embodiments of the disclosure.

FIG. 1 illustrates a block diagram of an exemplary indication device configuration system in transportation services, according to embodiments of the disclosure. In some embodiments of the present disclosure, system 100 may include different modules in a same device, such as an integrated circuit chip like Application Specific Integrated Circuit (ASIC) or Field Programmable Gate Array (FPGA). System 100 may include different modules with specific functions located in different devices. Components of system 100 may be integrated in an integrated device or distributed across different locations but may communicate with each other through network or bus.

In some embodiments of the present disclosure, system 100 may receive a transportation request from at least one user device 114, and each user device 114 may be operated by a user 116 to transmit the transportation request to system 100. If user 116 needs to take a vehicle from location A to location B, the transportation request may be used to instruct system 100 to provide transportation service to meet the transportation needs of user 116. When system 100 receive the transportation request, it may select one vehicle from multiple vehicles to match user 116. For example, system 100 may select a vehicle 110 operated by a driver 120 to match user 116. Having matched the user's transportation request with vehicle 110, system 100 may officially generate an order and send the order information to user device 114 and vehicle 110.

Vehicle 100 may be associated with an indication device 112 and a driver device 118. Vehicle 110 may be equipped with indication device 112 so that indication device 112 may send indication information to user 116 to indicate to user 116 that vehicle 110 is the matching vehicle dispatched by system to provide transportation service when vehicle 110 approaches user 116. Driver device 118 may be operated by driver 120. For example, driver device 118 may be a driver's mobile phone and/or another portable electronic device carried at all times or vehicle electronic equipment installed or fixed in vehicle 110. Driver device 118 may receive user information from system 100. For example, after the system has matched vehicle 110 with user 116, an order containing the information of user 116 may be sent to driver device 118, where the information includes the name, contact information (e.g., telephone number), location information (e.g., passenger pick-up information), destination and the like of user 116.

In some embodiments of the present disclosure, after system 100 has matched vehicle 110 with user 116, system 100 may generate a piece or pieces of specific indication information and send the indication information to user device 114. The indication information may be used to configure indication device 112 to send corresponding information so that indication device 112 may inform user 116 of the matching vehicle when vehicle 110 approaches user 116. At the same time, user 116 may receive the indication information through user device 114 and compare the indication information with the information sent by indication device 112 to identify the matching vehicle. Consistent with some embodiments of the present disclosure, indication information may also configure user device 114 to send corresponding information to indicate to driver 120 user 116 that is matched to the vehicle. At the same time, system 100 may send the indication information to driver device 118 so that driver 120 may compare the indication information with the information sent by user device 114 to identify a matching user.

In some embodiments of the present disclosure, system 100 may directly send the indication information to indication device 112 and user device 114. Consistent with some embodiments of the present disclosure, system 100 may send the indication information to vehicle 110, and then vehicle 110 may forward the indication information received to indication device 112. Consistent with some embodiments of the present disclosure, system 100 may send the indication information to driver device 118, and then driver device 118 may forward the indication information received to indication device 112. In other embodiments of the present disclosure, system 100 may only send the indication information to driver device 118. Driver 120 may identify the matching user (e.g., user 116) according to the indication information received.

Indication device 112 may be a device that can emit visible light (e.g., red, green, or blue light), display content (e.g., image and video) and/or output audio signals and can be installed inside or outside the vehicle. The indication device may be installed on a specific entrance or door of the vehicle to indicate to a user where to get in the vehicle or a place easy to see by a user, (e.g., the front window, the rear window, the place beside the license plate, etc.). The indication device may also be integrated in driver device 118 or realized by the screen, searchlight or speaker of driver device 118. In some embodiments of the present disclosure, when a vehicle approaches a user, the indication device installed on the vehicle may display the indication information used to configure the indication device to help the user identify the matching vehicle.

In some embodiments of the present disclosure, the indication information can be used to configure the way for the indication device to output content. For example, the indication information may be used to configure the indication device to output light of at least one color, at least one pattern, at least one mode and/or at least one lighting sequence. Consistent with some embodiments of the present disclosure, the light of at least one color may include any visible light, such as at least one type of white light, red light, orange light, yellow light, green light, blue light and purple light. The pattern may include any shape or text. For example, the pattern may include column, triangle, rectangle, circle, hash pattern, dot, etc. The pattern may also include a user's name, a vehicle's license plate, a pattern defined by user or driver, etc. The lighting sequence means that a plurality of light sources in the indication device may be lit in a predetermined sequence. For example, the indication device may include a plurality of light sources. The lighting sequence may include lighting from the middle to the four sides, lighting from the four sides to the middle, lighting from top to bottom, lighting from bottom to top, lighting from left to right, lighting from right to left, etc. A mode may refer to a particular arrangement for the indication device to output light. For example, the indication device may output color and pattern periodically, output color and pattern gradually or output color and pattern by fading in or fading out. Consistent with some embodiments of the present disclosure, the mode may also include the indication device output time. For example, the mode may include controlling the indication device to periodically fade in and fade out between two colors. For example, the indication device is controlled to output yellow light for 2 seconds then switch to white light for 1 second, and then switch back to yellow light for 2 seconds. Or, the mode may also include controlling the indication device to keep lighting for a predetermined period of time, such as 10 seconds, 20 seconds, etc.

In some embodiments of the present disclosure, the indication device may be mounted to the vehicle with different shapes or features of shell. For example, the indication device may include a body, a power supply or a power input port, a communication interface and a base. Consistent with some embodiments of the present disclosure, the body may be formed at least in part of a sub transparent, translucent, or transparent material. In other embodiments of the present disclosure, the body may include a display device (e.g., a flat panel display) that can output content. In other embodiments of the present disclosure, the body may include at least one surface that is substantially flat and whose length is much larger than its height and width (e.g., twice or more times larger), and/or whose height is much larger than its width (e.g., twice or more times larger). For example, the body may be in the shape of a blade. The body can output content or light according to the indication information.

The body may also be coupled to a base extending at least partially along the length direction of the body. The base may include at least one fastening mechanism or structure to enable the indication device to couple or fasten to the vehicle (e.g., permanently or temporarily). In some embodiments of the present disclosure, the base may accommodate one or more components of the indication device, such as a communication interface, a light source, a power supply or a power port, a display controller, a w or a connecting component, etc. The communication interface may enable the indication device to communicate with a driver device (e.g., wirelessly or via wires or cables) to receive indication information.

A user device 114 and/or a driver device 118 may include a desktop computer, a cellular device or a smart phone, a personal digital assistant (PDA), a laptop computer, a tablet device and a television (IP television), which may provide network connection and process resources to communicate with system 100 through network. Driver device 118 may also include, for example, an on-board computing system or customized hardware. User device 114 and/or driver device 118 may also run designated service applications respectively. Furthermore, although some embodiments of the present disclosure described herein relate to transportation requests, the system described herein may be used to provide other requests, such as food truck service requests, delivery requests, entertainment requests, etc.

In some embodiments of the present disclosure, vehicle 110 may include a manned or unmanned vehicle. The unmanned vehicle may include an automatic driving vehicle or a semi-automatic driving vehicle. In other embodiments of the present disclosure, vehicle 110 may include an unmanned aerial vehicle (UAV). When vehicle 110 is an unmanned vehicle, the matching between passenger and vehicle may mainly rely on indication device 112 on vehicle 110 to send indication information, which may be identified by user 116.

In some embodiments of the present disclosure, user device 114 may be a smart phone of user 116, and indication device 112 may be a smart phone of driver 118. For example, user 116 may send a transportation request to system 100 through a smart phone. System 100 may match user 116 with vehicle 110 according to the transportation requests. Vehicle 110 may travel to the location where user 116 is located according to the preset route to pick up user 116 to provide transportation service. After the matching is completed, system 100 may send indication information of same attributes to user device 114 and driver device 116 to enable user 116 and driver 120 to identify each other. The attributes may include at least one of color, pattern, lighting sequence, lighting mode, sound or light. For example, system 100 may send indication information with same color (e.g., red, blue) to user device 114 and driver device 118, or indication information with same pattern or sound. For example, system 100 may send to user device 114 and driver device 118 indication information with same icon, same light flashing mode or same color hanging mode, etc. After receiving the indication information, user 116 can identify vehicle 110 driven by driver 120 according to the indication information. Similarly, after receiving the indication information, driver 120 may also identify user 116 according to the indication information.

As illustrated in FIG. 1, system 100 may include a processor 102, a user device interface 104, a driver device interface 106, and a memory 108. These modules may be hardware units of system 100 (e.g., different parts of an integrated circuit), configured to be used with other components or to execute computer programs. The computer programs may be stored in a computer-readable medium (e.g., memory 108). When the computer programs are executed by system 100, system 100 can perform the functions and methods disclosed in the invention. In other embodiments of the present disclosure, processor 102, user device interface 104, driver device interface 106, and memory 108 may be distributed in different processors or may communicate remotely with each other.

User device interface 104 may be used to send data to or receive data from user device 114. In some embodiments of the present disclosure, user device 114 may send a transportation request to user device interface 104 for indicating to system 100 the transportation needs of user 116. User device interface 104 may send the transportation request to processor 102. In response to the transportation request, processor 102 may send vehicle information of the matching vehicle to user device 114 through user device interface 104. For example, processor 102 may send information such as the vehicle owner's identity, the license plate number of the vehicle and the like to user device 114 through the user device interface. In some embodiments of the present disclosure, user device interface 104 may be used to send indication information to user device 114 to help the user identify the matching vehicle.

Driver device interface 106 may be configured to send data to at least one of vehicle 110, indication device 112, or driver device 118. In some embodiments of the present disclosure, processor 102 may send information of a matching user to driver device 118 through driver device interface 106. For example, processor 102 may send the user's name, contact information (e.g., telephone number), location information (e.g., passenger pick-up information), destination and the like to driver device 118 through driver device interface 106. In some embodiments of the present disclosure, driver device interface 106 may be used to send indication information to vehicle 110, indication device 112, or driver device 118. In other embodiments of the present disclosure, driver device interface 106 may be used to receive information from driver device 118 or vehicle 110. For example, driver device interface 106 may be used to receive information such as vehicle location, vehicle speed, vehicle status and the like from the vehicle. For another example, driver device interface 106 may receive information such as the vehicle owner's identity, the plate number of the vehicle and the like from driver device 118.

Processor 102 may be configured to match users and vehicles according to transportation requests, and to send indication information to the users and the vehicles after the matching is completed. For example, processor 102 may receive a transportation request from user device 114 through user device interface 104, and processor 102 may match vehicle 110 to the user according to the transportation request. Processor 102 may send matching information to driver device 118 through driver device interface 106, or processor 102 may send the matching information to user device 114 through user device interface 104. In some embodiments of the present disclosure, processor 102 may send indication information to user device 114 through user device interface 104, or processor 102 may send the indication information to at least one of vehicle 110, indication device 112, or driver devices 118 through the driver device interface.

Processor 102 may include but not be limited to microcontroller, reduced instruction set computer (RISC), application specific integrated circuits (ASIC), application-specific instruction-set processor (ASIP), central processing unit (CPU), physics processing unit (PPU), digital signal processor (DSP), field programmable gate array (FPGA), etc.

Memory 108 may be configured to store data. Memory 108 may include but not limited to read-only memory (ROM), random-access memory (RAM), programmable read-only memory (PROM), electrically erasable programmable read-only memory (EEPROM), etc. The memory may include a non-transitory computer-readable medium having stored thereon code, logic or instructions for performing at least one step described elsewhere herein. System 100 may perform at least one step, individually or collectively, in accordance with the code, logic, or instructions of the non-transitory computer-readable medium described herein.

In some embodiments of the present disclosure, memory 108 may store map data. For example, processor may access memory 108 to obtain the data of each geographical area of the map, such as the shape, area, location, population density, vehicle density and other information of the geographical area. The geographical area can be used to assist vehicle arrangement.

In some embodiments of the present disclosure, system 100 may configure indication information by calculating the estimated time when the vehicle may arrive at the passenger pick-up point (hereinafter referred to as "arrival time"). For example, if a time difference between estimated arrival time of two vehicles is great (e.g., above a preset threshold), system 100 may assign indication information of same attributes to the two vehicles. Because it is unlikely that two vehicles will pick up passengers at the same place and at the same time, users associated with the two vehicles will not take a wrong vehicle because of the same color. If the time difference between estimated arrival time of the two vehicles is not great (e.g., below a preset threshold), system 100 may assign indication information of different attributes to the two vehicles so that the users associated with the two vehicles will not take a wrong vehicle. In some embodiments of the present disclosure, the preset thresholds may be obtained based on historical data, such as 30 seconds, 60 seconds, 2 minutes, etc.

Figure 2:
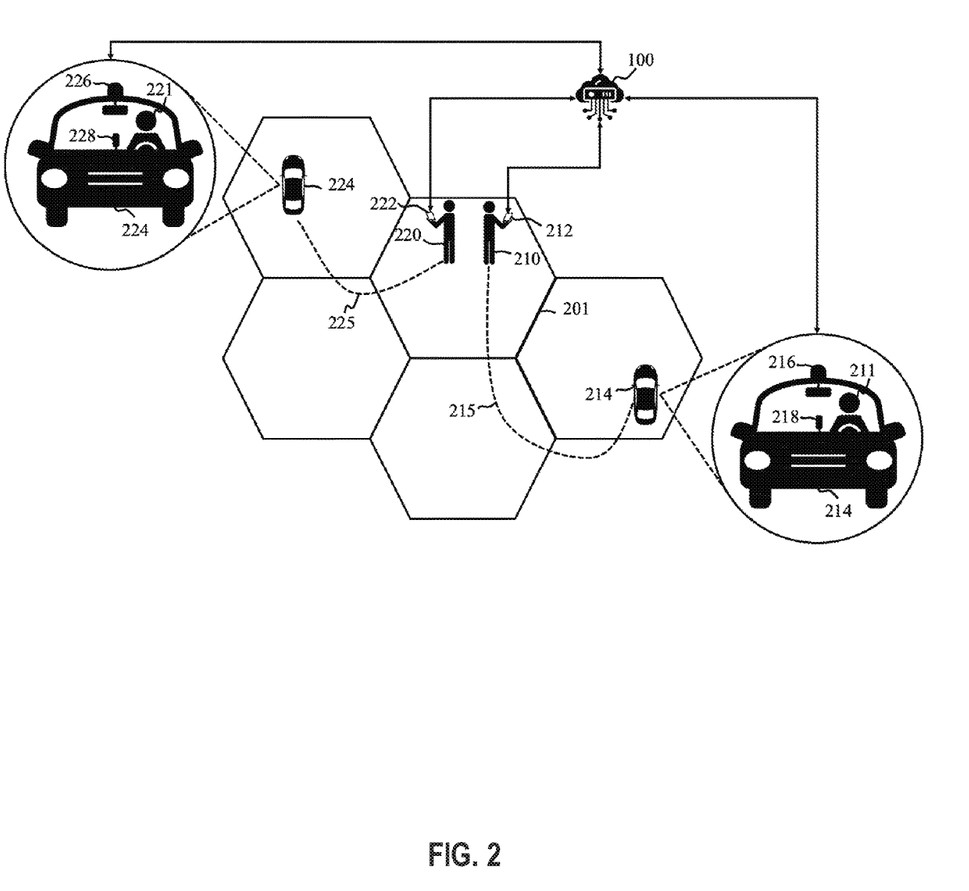
FIG. 2 illustrates a schematic diagram of an exemplary method for calculating a time difference between vehicle arrivals to configure an indication device, according to embodiments of the disclosure.

FIG. 2 illustrates a schematic diagram of an exemplary method for calculating the time difference of vehicle arrival to configure the indication devices, according to embodiments of the disclosure. A user 210 and user 220 may be located in a preset geographical area 201. The preset geographical area may be a geographical area predetermined by system 100 according to at least one parameter. The at least one parameter may include population density, vehicle density, transportation request density, etc. In some embodiments of the present disclosure, the shape of the preset geographical area may be a regular polygon (e.g., regular triangle, square, regular hexagon, etc.). The preset geographical area may also be of other suitable shapes, such as a circle, ellipse, rectangle, trapezoid, or irregular shape. The preset geographical area may not necessarily be of the same shape or size. For example, the preset geographical area in the downtown area may be relatively smaller, while the preset geographical area in the remote area may be relatively larger.

In some embodiments of the present disclosure, user 210 may send a transportation request to system 100 through a user device 212. System 100 may match a vehicle 214 with user 210 according to the transportation request. Vehicle 214 may be associated with a driver 211, a driver device 218, and an indication device 216. Driver 211 may drive vehicle 214 to the place where user 210 is located following a route 215 to pick up user 210 to provide transportation service. Similarly, a user 220 may use user device 222 to send a transportation request to system 100. System 100 may match vehicle 224 with user 220 according to the transportation request. Vehicle 224 may be associated with driver 221, a driver device 228, and an indication device 226. Driver 221 may drive vehicle 224 following a route 225 to the place where user 220 is located to pick up user 220 to provide transportation service.

In some embodiments of the present disclosure, system 100 may calculate the estimated time (a first estimated arrival time) for vehicle 214 to arrive at the place where user 210 is located, i.e. the time required for taking route 215. Similarly, system 100 may calculate the estimated time (a second estimated arrival time) for vehicle 224 to arrive at the place where user 220 is located, i.e. the time required for taking route 225. Furthermore, system 100 may calculate the time difference between the first estimated arrival time and the second estimated arrival time. When the time difference is above than a preset threshold value, system 100 may send first indication information to indication device 216 and second indication information to indication device 226, where the first indication information may share an attribute with the second indication. When the time difference is below the preset threshold value, system 100 can send the first indication information to indication device 216 and the second indication information to indication device 226, where the first indication information may have one or more attributes different from that of the second indication information. The attribute may include at least one of color, pattern, sequence, mode, sound or light.

In some embodiments of the present disclosure, system 100 may determine that the time difference is above the preset threshold. However, the time difference may be gradually reduced and become below the preset threshold due to traffic jam. In this case, user 210 or user 220 may see two vehicles with indication information of same attributes in preset geographical area 201. For example, the indication devices of the two vehicles may share a color. At this time, system 100 may further alter the configuration of the indication device to help user 210 and user 220 confirm the matching vehicle.

In some embodiments of the present disclosure, a user may operate a user device to send an indication information change request to system 100. For example, user 210 may operate user device 212 to send an indication information change request to system 100. After receiving the indication information change request, system 100 may send third indication information to indication device 216 and user device 212 to replace the first indication information. The third indication information may no longer have the same attribute as the second indication information, but rather have one or more attributes different from that of the second indication information.

In some embodiments of the present disclosure, a user may operate a user device to send an indication information change request to system 100. For example, user 210 may operate user device 212 to send an indication information change request to system 100. After receiving the indication information change request, system 100 may determine whether vehicle 214 and vehicle 224 are located in preset geographical area 201. If so, system 100 may send third indication information to indication device 216 and user device 212 to replace the first indication information. The third indication information may no longer have the same attribute as the second indication information, but rather have one or more attributes different from that of the second indication information.

In some embodiments of the present disclosure, system 100 may verify whether there exist two vehicles sharing same attributes of indication information in preset geographical area 201. If so, system 100 may reassign indication information to help a user identify a matching vehicle. For example, system 100 may verify whether both vehicle 214 and vehicle 224 are located in preset geographical area 201. If so, system 100 may send third indication information to indication device 216 and user device 212 to replace the first indication information. The third indication information may have one or more attributes different from that of the second indication information. System 100 may send the third indication information to indication device 226 and user device 222 to replace the second indication information, achieving an effect of altering the configuration. Consistent with some embodiments of the present disclosure, system 100 may also send a notification to the user after sending the third indication information to inform the user that the first indication information has been replaced. For example, system 100 may push a notification to user device 212 to inform the user that the first indication information has been replaced.

In some embodiments of the present disclosure, system 100 may receive a plurality of transportation requests, where the plurality of transportation requests may include passenger pick-up points located in a preset geographical area (e.g., preset geographical area 201). The passenger pick-up points may be manually input by a user when making a transportation request, or it may be generated by system 100 through automatically detecting the user's location. In some embodiments of the present disclosure, the user can order the transportation service for a friend, colleague, or family member who may be elsewhere so that the passenger pick-up points need not to be the same as the location of the user. System 100 can identify the first transportation request that matches vehicle 214 and the second transportation request that matches vehicle 224, and system 100 can detect that vehicle 214 and vehicle 224 are both located in preset geographical area 201. At this time, system 100 may determine whether the indication information assigned with the first transportation request shares an attribute with the second indication information assigned with the second transportation request. If so, it is easy to cause confusion, and then system 100 may adjust the first indication information or the second indication information so that the first indication information may no longer have the same attribute as the second indication information, but rather have one or more attributes different from that of the second indication information.

In some embodiments of the present disclosure, system 100 may send the adjusted indication information to indication device 216. Consistent with some embodiments of the present disclosure, system 100 may send the adjusted indication information to user device 212. Similarly, system 100 may send the adjusted indication information to indication device 226 and/or user device 222.

Figure 3:
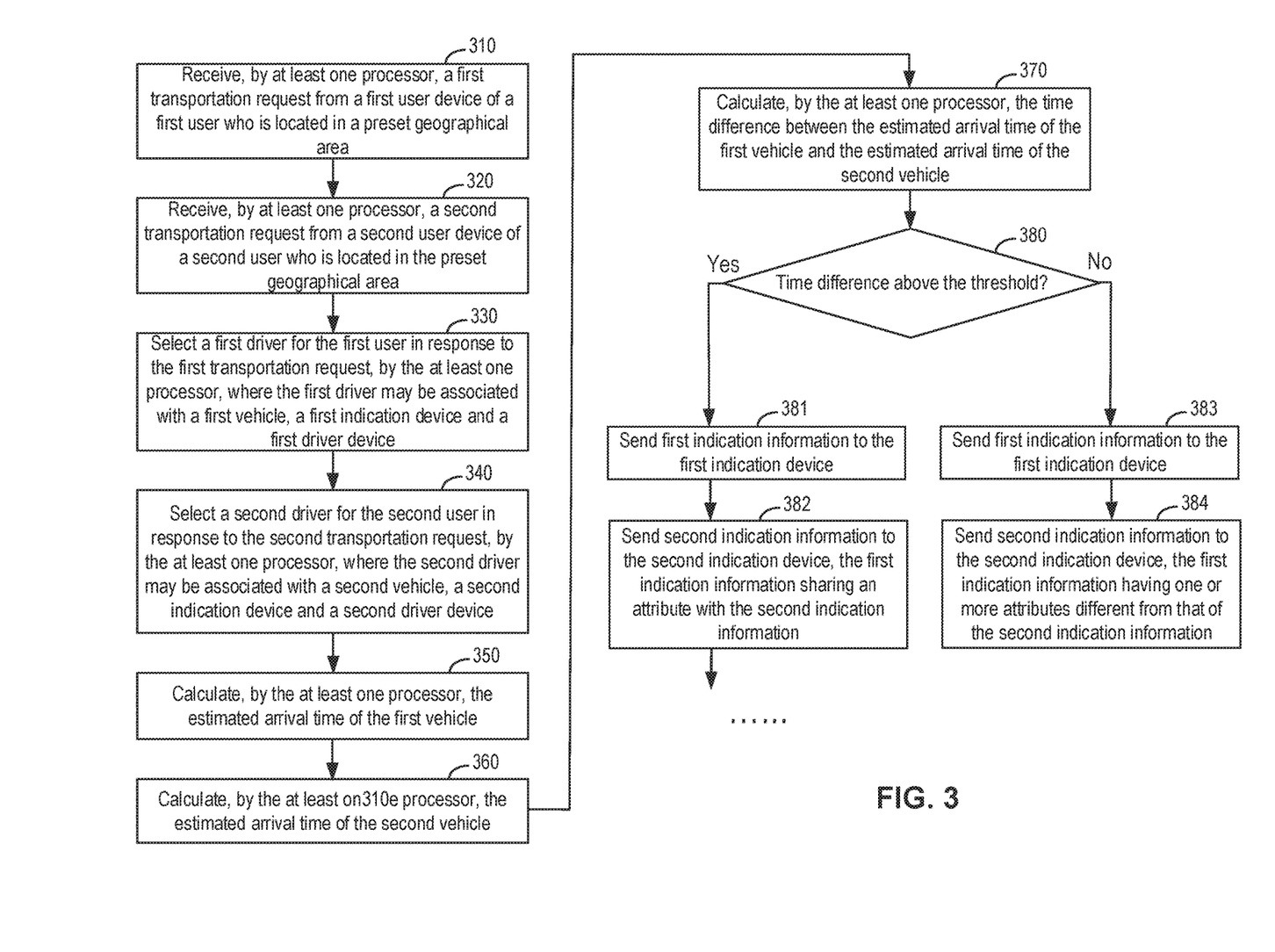
FIG. 3 illustrates a flowchart of an exemplary method for configuring an indication device to provide transportation service, according to embodiments of the disclosure.

FIG. 3 illustrates a flowchart of an exemplary method for configuring the indication devices to provide transportation service, according to embodiments of the disclosure. In some embodiments of the present disclosure, the method illustrated in FIG. 3 may be executed by system 100 (e.g., executed by processor 102). The method illustrated in FIG. 3 may include steps 310-384 described below. It is worth noting that some of these steps are optional for the implementation of the present invention. Furthermore, some of these steps can be performed at the same time or in a different order from that illustrated in FIG. 3.

As illustrated in FIG. 2 and FIG. 3, in step 310, processor 102 may receive a first transportation request from a first user device of a first user who is located in a preset geographical area. In some embodiments of the present disclosure, processor 102 may receive the first transportation request from user device 212 operated by user 210 who is located in preset geographical area 201.

In step 320, processor 102 may receive a second transportation request from a second user device of a second user who is located in the preset geographical area. In some embodiments of the present disclosure, processor 102 may receive the second transportation request from user device 222 operated by user 220 who is located in preset geographical area 201.

In step 330, in response to the first transportation request, processor 102 may select a first driver for the first user, where the first driver may be associated with a first vehicle, a first indication device and a first driver device. In some embodiments of the present disclosure, in response to the first transportation request, processor 102 may select driver 211 for user 210. Driver 211 may be associated with vehicle 214, indication device 216, and driver device 218.

In step 340, in response to the second transportation request, processor 102 may select a second driver for the second user, where the second driver may be associated with a second vehicle, a second indication device and a second driver device. In some embodiments of the present disclosure, in response to the second transportation request, processor 102 may select driver 221 for user 220. Driver 221 may be associated with vehicle 224, indication device 226, and driver device 228.

In step 350, processor 102 may calculate the estimated time when the first vehicle may arrive at a passenger pick-up point. In some embodiments of the present disclosure, processor 102 may calculate the estimated time for vehicle 214 to arrive at the location of user 210 following route 215. For example, processor 102 may acquire the length of route 215, and then divide the length by the speed of vehicle 214 to obtain the estimated arrival time. In other embodiments of the present disclosure, processor 102 may calculate and update the estimated arrival time in real time. For example, processor 102 may acquire the speed of vehicle 214 in real time, and then update the estimated arrival time in real time according to the real-time speed. Consistent with some embodiments of the present disclosure, processor 102 may update the estimated arrival time in real time based on traffic condition. For example, processor 102 may acquire the speed and traffic condition of vehicle 214 in real time, and then update the estimated arrival time in real time according to the real-time speed and traffic condition. Consistent with some embodiments of the present disclosure, processor 102 may also use a machine learning model to predict the vehicle arrival time.

In step 360, processor 102 may calculate the estimated arrival time of the second vehicle. In some embodiments of the present disclosure, processor 102 may calculate the estimated time for vehicle 224 to arrive at the location of user 220 following route 225. The calculation method is consistent with the one described in step 350, hence it will not be repeated here.

In step 370, processor 102 may calculate the time difference between the estimated arrival time of the first vehicle and the estimated arrival time of the second vehicle. In some embodiments of the present disclosure, processor 102 may calculate the time difference between the estimated arrival time of vehicle 214 and the estimated arrival time of vehicle 224. For example, processor 102 may update the estimated arrival time of vehicle 214 and vehicle 224 in real time and may calculate the time difference between the estimated arrival time of vehicle 214 and that of vehicle 224 in real time.

In step 380, processor 102 may determine whether the time difference is above a preset threshold.

If the time difference is above the preset threshold, processor 102 may send the first indication information and the second indication information to the first indication device and the second indication device respectively in step 381 and step 382, where the first indication information shares an attribute with the second indication information. In some embodiments of the present disclosure, processor 102 may send the first indication information to indication device 216 and the second indication information to indication device 226, where the first indication information shares an attribute with the second indication information.

If the time difference is below the preset threshold, processor 102 may send the first indication information and the second indication information to the first indication device and the second indication device respectively in step 383 and step 384, where the first indication information may have one or more attributes different from that of the second indication information. In some embodiments of the present disclosure, processor 102 may send the first indication information to indication device 216 and the second indication information to indication device 226, where the first indication information may have one or more attributes different from that of the second indication information.

Figure 4:
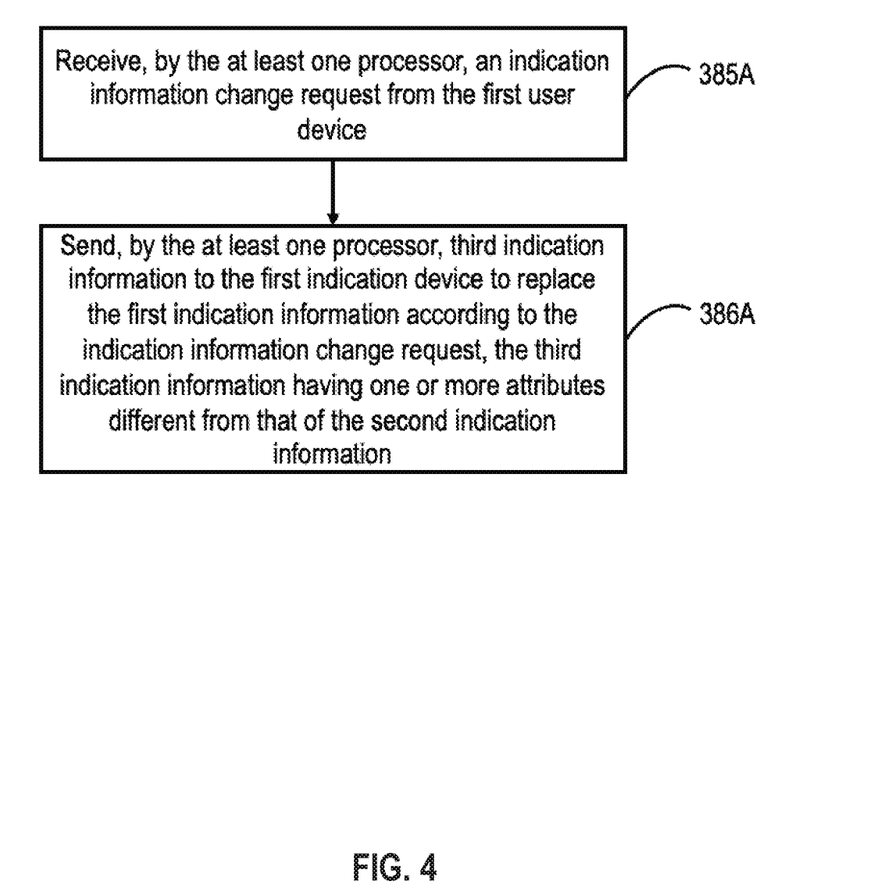
FIG. 4 illustrates a flowchart of an exemplary method for configuring an indication device to avoid mismatches, according to embodiments of the disclosure.
Figure 5:
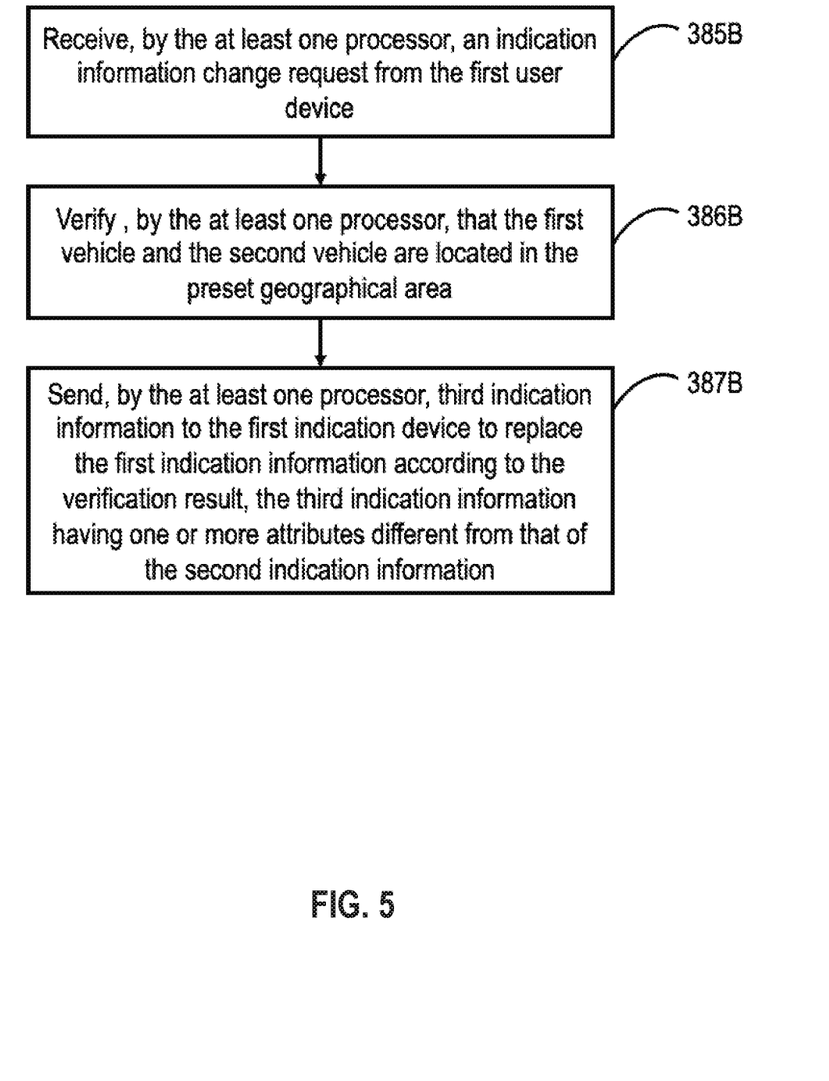
FIG. 5 illustrates a flowchart of another exemplary method for configuring an indication device to avoid mismatches, according to embodiments of the disclosure.
Figure 6:
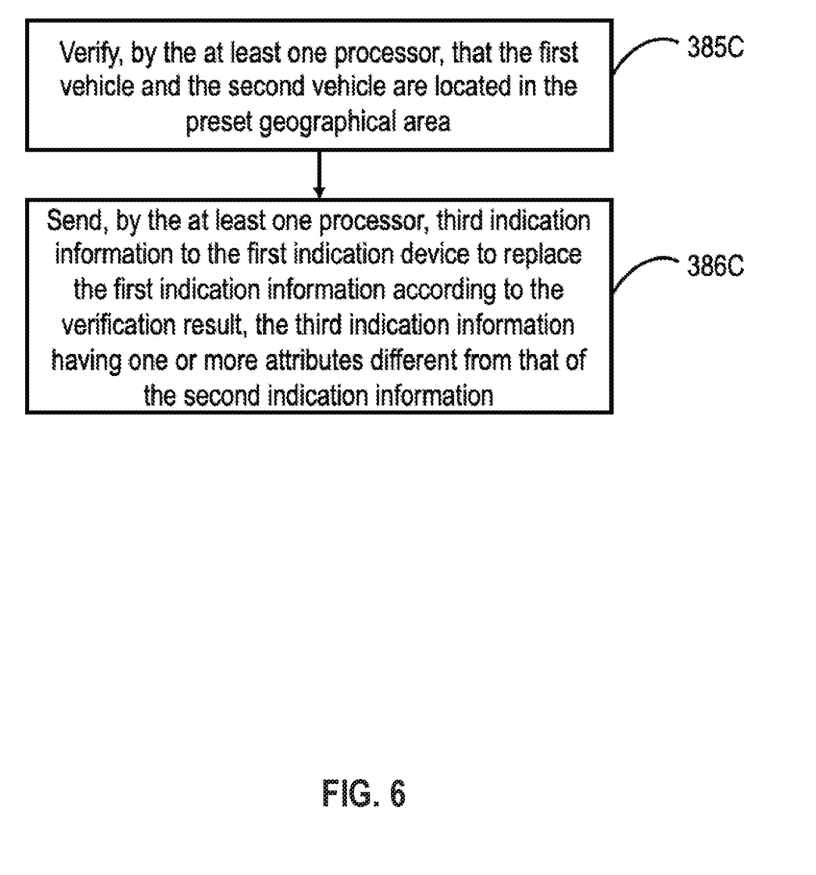
FIG. 6 illustrates a flowchart of yet another exemplary method for configuring the indication device to avoid mismatches, according to embodiments of the disclosure.

In some embodiments of the present disclosure, even though a processor may determine in step 380 that the time difference is above the preset threshold, the time difference may be gradually reduced and become below the preset threshold due to traffic jam. At this time, the first vehicle and the second vehicle may enter the preset geographical area (e.g., preset geographical area 201) at a similar time, which may make it difficult for the user to identify the matching vehicle. In this case, processor 102 may further configure the indication device to help the user identify the matching vehicle and avoid mismatches. FIGS. 4-6 are flowcharts of exemplary methods for configuring indication devices to avoid mismatches, according to embodiments of the present disclosure.

Referring to FIG. 4, in step 385A, processor 102 may receive an indication information change request from the first user device. In some embodiments of the present disclosure, after the user finds that two vehicles with indication information of same attributes appear in the preset geographical area, the user can send an indication information change request to processor 102 through the user device to prevent mismatches. For example, user 210 may send the indication information change request to processor 102 through user device 212.

In step 386A, processor 102 may send third indication information to the first indication device to replace the first indication information according to the indication information change request, where the third indication information may have one or more attributes different from that of the second indication information. For example, processor 102 may send third indication information to indication device 216 to replace the first indication information according to the indication information change request, where the third indication information may have one or more attributes different from that of the second indication information.

Referring to FIG. 5, in step 385B, processor 102 may receive an indication information change request from the first user device. In some embodiments of the present disclosure, after the user finds that two vehicles with indication information of same attributes appear in the preset geographical area, the user can send an indication information change request to processor 102 through the user device to prevent mismatches. For example, user 210 may send the indication information change request to processor 102 through user device 212.

In step 386B, processor 102 may verify that the first vehicle and the second vehicle are located in the preset geographical area. In some embodiments of the present disclosure, processor 102 can obtain the locations of vehicle 214 and vehicle 224 to verify that vehicle 214 and vehicle 224 are indeed located in the preset geographical area, hence it is easy to avoid confusion in matching.

In step 387B, processor 102 may send third indication information to the first indication device to replace the first indication information according to the verification result, where the third indication information may have one or more attributes different from that of the second indication information. In some embodiments of the present disclosure, after processor 102 confirms that vehicle 214 and vehicle 224 are both located in the preset geographical area, processor 102 may send third indication information to indication device 216 to replace the first indication information. The third indication information may have one or more attributes different from that of the second indication information. If processor 102 finds that vehicle 214 and vehicle 224 are not both located in the preset geographical area, it may decide not to change the indication information.

Referring to FIG. 6, in step 385C, processor 102 may voluntarily verify that the first vehicle and the second vehicle are located in the preset geographical area when the user has not made an indication information change request. In some embodiments of the present disclosure, processor 102 may acquire the locations of vehicle 214 and vehicle 224 to verify whether vehicle 214 and vehicle 224 are both located in the preset geographical area. The voluntary verification may be carried out periodically or aperiodically. For example, processor 102 may perform the verification only when the vehicle approaches passenger pick-up points, rather than during the travelling. If two vehicles both pass a preset geographical area en route to their destinations, because it is not a passenger pick-up point, confusion in matching will not happen no matter how short the distance between the two vehicles may be. Alternatively, processor 102 may also choose to verify only in the preset geographical area where the passenger pick-up point of the vehicle is located.

In step 386C, processor 102 may send third indication information to the first indication device to replace the first indication information according to the verification result, where the third indication information may have one or more attributes different from that of the second indication information. In some embodiments of the present disclosure, after processor 102 confirms that vehicle 214 and vehicle 224 are both located in the preset geographical area, processor 102 may send third indication information to indication device 216 to replace the first indication information, where the third indication information may have one or more attributes different from that of the second indication information. Consistent with some embodiments of the present disclosure, processor 102 may also send a notification to the user after sending the third indication information to inform the user that the first indication information has been replaced. For example, processor 102 may push a notification to user device 212 to inform user 210 that the first indication information has been replaced.

Figure 7:
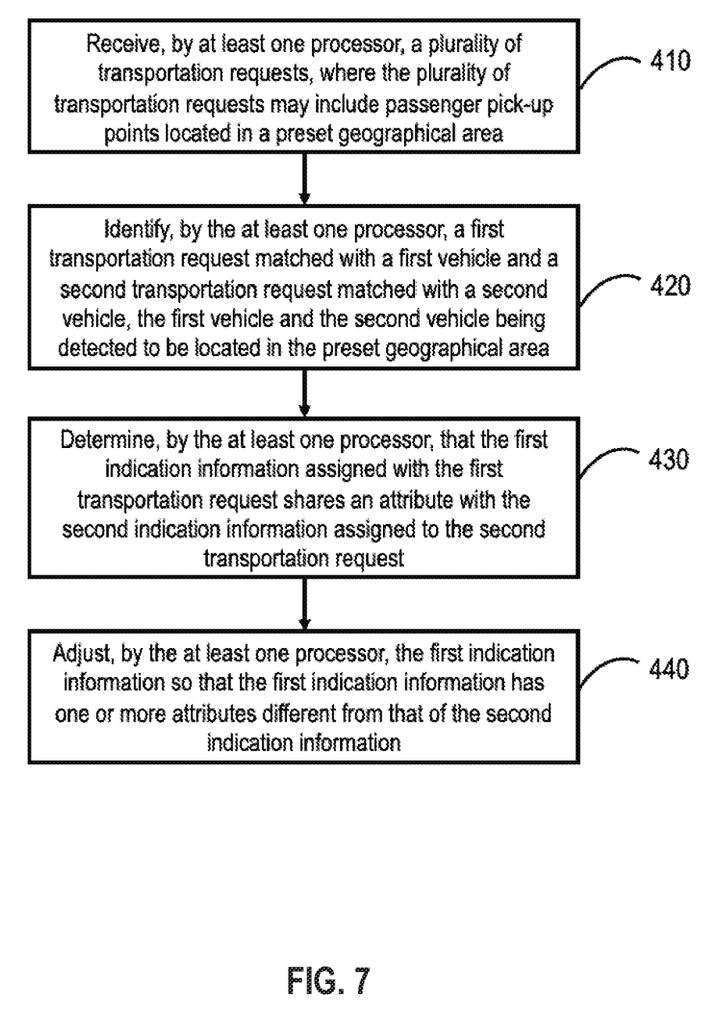
FIG. 7 illustrates a flowchart of another exemplary method for configuring the indication device to provide transportation service, according to embodiments of the disclosure.

FIG. 7 illustrates another flowchart of an exemplary method for configuring the indication devices to provide transportation service, according to embodiments of the disclosure. Referring to FIG. 7, in step 410, processor 102 may receive a plurality of transportation requests, where the plurality of transportation requests may include passenger pick-up points located in a preset geographical area. For example, the passenger pick-up points of the plurality of transportation requests may all be located in preset geographical area 201.

In step 420, processor 102 may identify a first transportation request matched with a first vehicle and a second transportation request matched with a second vehicle, where the first vehicle and the second vehicle may be detected to be located in the preset geographical area. In some embodiments of the present disclosure, processor 102 may identify a first transportation request matched with a first vehicle and a second transportation request matched with a second vehicle from the plurality of transportation requests, where the corresponding passenger pick-up points of the first vehicle and the second vehicle may both be located in the preset geographical area, and both vehicles may be detected to be located in the preset geographical area at the same time. For example, processor 102 may identify a first transportation request that matches vehicle 214 and a second transportation request that matches vehicle 224, and processor 102 may detect that vehicle 214 and vehicle 224 are both located within preset geographical area 201.

In step 430, processor 102 may determine that the first indication information assigned with the first transportation request shares an attribute with the second indication information assigned with the second transportation request. For example, processor 102 may determine that the first indication information may share same attributes with the second indication information, such as color, pattern, sound or lighting, etc.

In step 440, processor 102 may adjust the first indication information so that the first indication information may have one or more attributes different from that of the second indication information. In some embodiments of the present disclosure, processor 102 may send the adjusted indication information to indication device 216. Consistent with some embodiments of the present disclosure, processor 102 may send the adjusted indication information to user device 212. Similarly, system 100 may send the adjusted indication information to indication device 226 and/or user device 222.

The system and method provided by the present disclosure can effectively reduce the types of indication information in an area without affecting the matching of users and vehicles, and effectively utilize the server and communication resources. Using the system and method provided by the present disclosure, a user can complete matching with the vehicle conveniently and quickly.

It will be apparent to those skilled in the art that various modifications and variations can be made to the disclosed systems and related methods. Other embodiments will be apparent to those skilled in the art from consideration of the specification and practice of the disclosed systems and related methods.

It is intended that the specification and examples be considered as exemplary only, with a true scope being indicated by the following claims and their equivalents.

What is claimed is:

1. A method for configuring indication devices to provide transportation service, the method comprising:
   receiving, by at least one processor, a plurality of transportation requests including passenger pick-up points located in a preset geographical area;
   identifying, by the at least one processor, a first transportation request matching a first vehicle and a second transportation request matching a second vehicle, wherein the first vehicle and the second vehicle are detected to be located in the preset geographical area;
   determining, by the at least one processor, that an attribute of first indication information assigned to indicate the first vehicle is matched with the first transportation request is same to an attribute of second indication information assigned for the second vehicle to indicate it is matched with the second transportation request; and
   adjusting, by the at least one processor, the first indication information so that the attribute of the first indication information is different from the attribute of the second indication information.

2. The method of claim 1, the method further comprising:
   sending, by the at least one processor, the adjusted first indication information to an indication device associated with the first vehicle.

3. The method of claim 1, the method further comprising:
   sending, by the at least one processor, the adjusted first indication information to a user device used by a user, wherein the user is picked up by the first vehicle.

4. The method of claim 1, wherein the preset geographical area has a shape of a regular polygon.

5. The method of claim 4, wherein the preset geographical area has a shape of a regular hexagon.

6. The method of claim 1, further comprising:
   determining a time difference between a first estimated time for the first vehicle to arrive in the preset geographical area and a second estimated time for the second vehicle to arrive in the preset geographical area; and
   adjusting the first indication information based on the time difference.

7. The method of claim 6, wherein the first indication information is adjusted when the time difference is smaller than a threshold.

8. A system for configuring indication devices to provide transportation service, the system comprising:
   a communication interface configured to receive transportation requests; and
   at least one processor configured to:
      receive a plurality of transportation requests including passenger pick-up points located in a preset geographical area;
      identify a first transportation request matching a first vehicle and a second transportation request matching a second vehicle, wherein the first vehicle and the second vehicle are detected to be located in the preset geographical area;
      determine that an attribute of first indication information assigned to indicate the first vehicle is matched with the first transportation request is same to an attribute of second indication information assigned for the second vehicle to indicate it is matched with the second transportation request; and
      adjust the first indication information so that the attribute of the first indication information is different from the attribute of the second indication information.

9. The system of claim 8, wherein the at least one processor sends the adjusted first indication information to an indication device associated with the first vehicle.

10. The system of claim 8, wherein the at least one processor sends the adjusted first indication information to a user device used by a user, wherein the user is picked up by the first vehicle.

11. The system of claim 8, wherein the preset geographical area has a shape of a regular polygon.

12. The system of claim 11, wherein the preset geographical area has a shape of a regular hexagon.

13. The system of claim 8, wherein the at least one processor is further configured to:
   determine a time difference between a first estimated time for the first vehicle to arrive in the preset geographical area and a second estimated time for the second vehicle to arrive in the preset geographical area; and
   adjust the first indication information based on the time difference.

14. The system of claim 13, wherein the first indication information is adjusted when the time difference is smaller than a threshold.

15. A non-transitory computer-readable medium having stored thereon computer instructions, when executed by at least one processor, perform a method for configuring indication devices to provide transportation service, the method comprising:
   receiving a first transportation request including a first passenger pick-up point located in a preset geographical area, the first transportation request matching a first vehicle associated with a first indication device;

receiving a second transportation request including a second passenger pick-up point located in the preset geographical area, the second transportation request matching a second vehicle associated with a second indication device;

determining, by the at least one processor, that an attribute of first indication information assigned to indicate the first vehicle is matched with the first transportation request is same to an attribute of second indication information assigned for the second vehicle to indicate it is matched with the second transportation request;

determining a time difference between a first estimated time for the first vehicle to arrive in the preset geographical area and a second estimated time for the second vehicle to arrive in the preset geographical area is smaller than a threshold; and adjusting, by the at least one processor, the first indication information so that the attribute of the first indication information is different from the attribute of the second indication information.

16. The non-transitory computer-readable medium of claim 15, wherein the method further comprises:
sending the adjusted first indication information to an indication device associated with the first vehicle.

17. The non-transitory computer-readable medium of claim 15, wherein the method further comprises:
sending the adjusted first indication information to a user device used by a user, wherein the user is picked up by the first vehicle.

18. The non-transitory computer-readable medium of claim 15, wherein the preset geographical area has a shape of a regular polygon.

19. The non-transitory computer-readable medium of claim 18, wherein the preset geographical area has a shape of a regular hexagon.

* * * * *